Oct. 29, 1946.          E. W. KELLOGG          2,410,289
                    ELECTRICAL SERVO SYSTEM
                    Filed Dec. 17, 1943
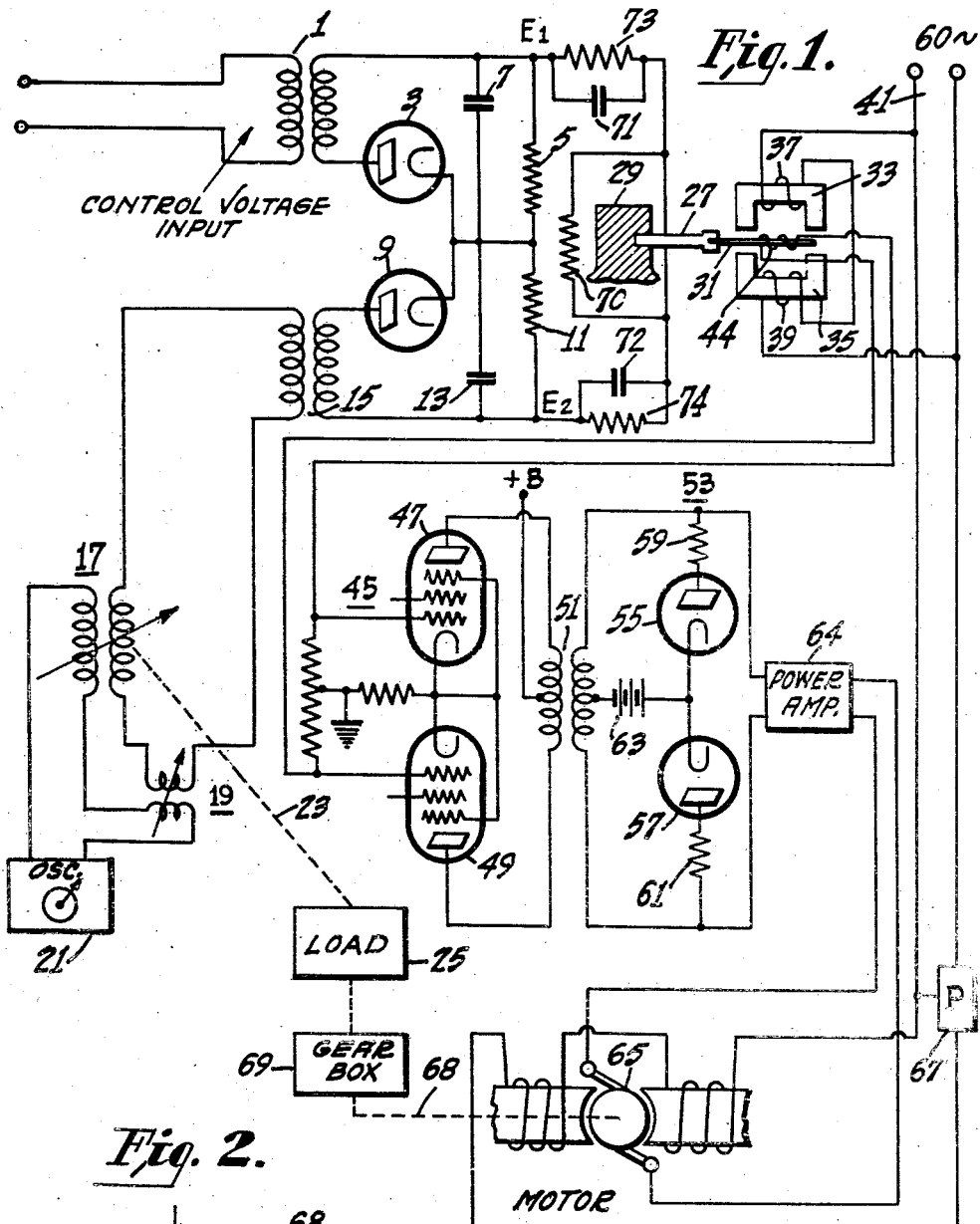
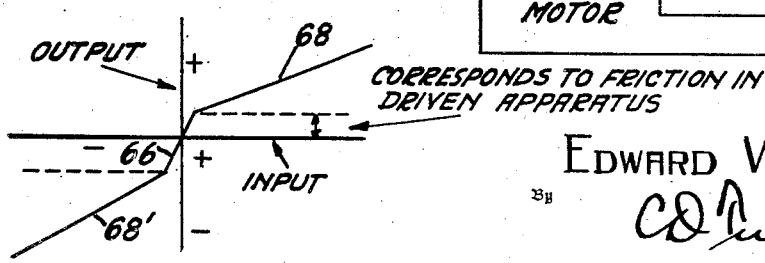
Inventor
EDWARD W. KELLOGG
By C. D. Tuska
Attorney Patented Oct. 29, 1946

2,410,289

UNITED STATES PATENT OFFICE 2,410,289

ELECTRICAL SERVO SYSTEM

Edward W. Kellogg, Indianapolis, Ind., assignor to Radio Corporation of America, a corporation of Delaware Application December 17, 1943, Serial No. 514,705

7 Claims. (Cl. 172—239)

This invention relates to electrical servo systems, and more particularly to improvements in the art of controlling an electric motor to drive a mechanical load device in response to variations in the magnitude of a control voltage, so that upon the occurrence of any given control voltage magnitude, the load is driven to a corresponding position. Such systems are, broadly, well known to those skilled in the art, and are of wide general application. The present invention, while also applicable to numerous uses, is particularly adapted for record responsive control systems of the type described in copending application Serial Number 509,932, filed November 11, 1943, by E. W. Kellogg and entitled F-M control track operation.

The principal object of the present invention is to provide an improved method of and means for voltage responsive motor control.

Another object is to provide an improved method of and means for compensating the effects of static friction upon the accuracy of performance of systems of the described type.

Another object is to provide an improved motor control system in which any tendency to overshoot or oscillate is prevented.

These and other objects will become apparent to those skilled in the art upon consideration of the following description, with reference to the accompanying drawing, of which Figure 1 is a schematic circuit diagram of a voltage-responsive servo system according to the instant invention, and Figure 2 is a graph of the amplitude characteristic of one of the elements of the circuit of Figure 1.

In the following description, it is assumed that the control voltage is alternating, substantially at constant frequency, and carries the control intelligence in the form of variations in amplitude. Subsequently it will be shown that the system is readily adaptable for use with variable magnitude D.-C. control voltage.

Referring to Figure 1, the control voltage input is applied through a transformer 1 to a rectifier circuit including a diode 3, a load resistor 5, and a filter capacitor 7. A second rectifier including a diode 9, load resistor 11, and capacitor 13 has its input circuit coupled through a transformer 15 to the secondaries of two variable-coupling transformers 17 and 19 in series. The primaries of the transformers or couplers 17 and 19 are connected in series with each other to an oscillator 21. The connections of the transformers 17 and 19 are such that their outputs oppose each other at the common input transformer 15. By properly adjusting the coupling of transformer 19, the position of transformer 17 at which the combined voltage becomes zero can be set where desired. The movable winding of the transformer 17 is mechanically coupled to the load device 25 to be driven by the system as indicated by the dash line 23.

The rectifier load resistors 5 and 11 are connected in series with each other and through a network comprising elements 70, 71, 72, 73 and 74, whose function will hereinafter be explained, to a piezo-electric crystal 27, which is preferably a Rochelle salt crystal bimorph of the "bender" type, or the like. For the immediate discussion the voltage across the crystal 27 may be assumed to be the same as the total voltage across resistances 5 and 11. The rectifier diodes 3 and 9 are connected as shown in "back-to-back" relationship, so that the rectifier outputs oppose each other at the input to the crystal 27.

One end of the crystal 27 is secured to a stationary support 29, and the other end carries a magnetically permeable armature member 31 extending between opposed stationary pole members 33 and 35. The pole members 33 and 35 are provided with windings 37 and 39 respectively, both connected to A.-C. lines 41. The directions of winding and connections are such that the windings 37 and 39 tend to set up opposing magnetic fluxes in the armature 31. Surrounding the armature 31 and disposed lengthwise thereof is a pick-up winding 44, connected to the input circuit of an amplifier 45 including electron discharge tubes 47 and 49 connected in push pull.

The amplifier 45 is coupled through a transformer 51 to a push pull limiter circuit 53 comprising a pair of diodes 55 and 57, series resistors 59 and 61 respectively, and a bias battery 63. The diode 55, resistor 59, and battery 63 are connected in series with each other across one side of the push pull circuit, and the diode 57, resistor 61 and the battery 63 are similarly connected across the other side. As long as the signal voltage across one side of the secondary of the transformer 51 is less than that of the battery 63, no current flows through the battery or either of the diodes, and the circuit 53 functions only as a coupling link between the amplifier 45 and the power amplifier 64 which is connected to the limiter circuit 53. If the signal peaks exceed the battery voltage, current flows through the diodes, effectively connecting the resistors 59 and 61 across the secondary of the transformer 51 and thereby attenuating the output of the amplifier 45. The input-output characteristic of the limiter 53 is illustrated by the graph of Figure 2. The steeply sloping portion 66 occurs over the range through which battery voltage exceeds the signal and the diodes are non-conducting. The width of this range is determined by the battery voltage. The flatter portions 68, 68' occur over the ranges in which the diodes conduct. The slopes of these portions depend upon the resistance of the resistors 59 and 61.

The output of the power amplifier 64 is applied to one of the power input circuits of an A.-C. motor 65. By way of example, the motor 65 is a separately excited commutator type motor, with its armature energized by the amplifier 64 and its field winding connected to the A.-C. lines 41. A phase shifter 67 may be included in the field circuit to enable energization of the field and armature windings of the motor 65 in phase with each other for optimum efficiency. The shaft of the motor 65 is coupled to the load device 25, as indicated by the dash line 63. Suitable gearing may be interposed between the motor 65 and the load as indicated by the gear box 69.

The adjustment and operation of the above described system is as follows: The load device 25 is to be driven by the motor 65 to a position corresponding to the magnitude of the control input voltage. With zero control input, the coupling of the transformer 19 is adjusted so that when the load device, and consequently the movable winding of the transformer 17 is at the position corresponding to zero input, the secondary voltage of the transformer 19 balances out that of the transformer 17 at the input transformer 15. Under these conditions, the outputs of the diodes 3 and 9 are both zero, no voltage is applied to the crystal 27 and the armature 31 remains in its neutral position. The voltage induced in the pickup winding 44 is zero, and hence the output of the chain comprising the amplifier 45, limiter 53, and amplifier 64 is also zero, and the armature of the motor 65 is not energized.

Upon the occurrence of a control signal voltage of other than zero value at the input transformer 1, the rectifier 3 produces D.-C. output at the resistor 5 and the crystal 27. This voltage causes the crystal to bend, for example, upward, unbalancing the magnetic circuit comprising the armature 31 and the pole members 33 and 35. Alternating current is induced in the winding 44, is amplified by the amplifier 45, is passed through the limiter 53, is amplified by the amplifier 64, and is applied to the motor 65. The direction of the amplified current applied to the motor with respect to that of the A.-C. line 41 depends upon whether the armature 31 is deflected upward or downward. Thus the motor 65 will run in one direction if the voltage across the resistor 5 exceeds that across the resistor 11, deflecting the crystal 27 upwards, and in the opposite direction if the voltage across the resistor 5 is less than that across the resistor 11. In either event, the motor 65 drives the load 25, and with it the movable winding of the transformer 17 to a position such that the net voltage applied to the rectifier 9 through the input transformer 15 is equal to the control voltage applied to the rectifier 3 through the transformer 1. The voltages across the resistors 5 and 11 are then equal, and oppose each other at the crystal 27. The crystal thus returns to its undeflected position, and conditions through the remainder of the system are the same as with zero signal as described above. The motor 65 is de-energized, and remains so as long as the magnitude of the control voltage input remains constant. If the control voltage is increased or decreased, the motor 65 is energized to run correspondingly in one direction or the other to restore the balance and move the load device 25 to the corresponding new position.

As a result of inertia and friction in the load device and driving motor, together with time delays introduced by the several components of the control channel, there is a tendency exhibited by substantially any type of servo system to over-shoot the correct load position, causing reverse energization of the motor, overshooting in the opposite direction, and so on. If the control sensitivity is great enough, sustained oscillation about the correct position may occur. If the control sensitivity is low enough, the load may never reach the proper position on account of "stalling" of the motor at low speed by friction. Adjustment of the sensitivity to some intermediate value does not solve the problem, since the coefficients of static friction are generally greater than the coefficients of dynamic friction. These effects are well known to those skilled in the art, and numerous efforts to combat them have been made, with varying degrees of success. Copending U. S. application filed March 31, 1943, Serial No. 481,256 by A. V. Bedford entitled improvements in Servo mechanism circuits and assigned to the same assignee as the present application, discloses one method of and means for overcoming inaccuracy of operation caused by inertia and friction effects in electrical servo systems, by passing the control signal through two parallel channels, one providing high gain but tending to saturate at relatively low signal level, and the other providing low gain and relatively high signal level capability. The amplitude characteristic of said system is substantially identical to that illustrated in Figure 2. The limiter circuit 53 of the present system provides effects like those secured by said Bedford system, with somewhat simpler circuit arrangement and fewer components. The steeply sloping portion 66 of the characteristic extends up to the point at which the motor is just sufficiently energized to overcome the static friction. The more gradually sloping portions 68, 68′, representing relatively low control sensitivity, extends over the operating range of the system. Thus at or near the balance point where the speed is low, with correspondingly low inertia effect, and the friction force is large, the motor is strongly energized in response to small deviations of the load device from the correct position. Away from the balance point, where the speed tends to be higher, producing greater momentum, the sensitivity is lower, reducing the tendency toward overshooting. The advantages of these characteristics are described in more detail in said Bedford application. Despite the desirable characteristics of the system for controlling motor input as illustrated in Figure 2 there is an inherent possibility for the motor to overshoot and then return, producing an oscillatory effect. It is desirable that the motor input be reduced not simply as a function of the distance of the load from the balance position but as a function of the rate of approach. This will slow down the motor a little more rapidly and reduce the tendency to overshoot. It will in fact produce an effect equivalent to damping. Across the terminals indicated at $E_1$ and $E_2$ is a voltage which is proportional to the difference between the load position and the balance position which it is seeking. If to this voltage is added a component proportional to its rate of change, then the voltage which drives the motor will be reduced during a period when it is approaching balance and will be increased when due to a change in control tone output the balance point is departing from a previous setting. The circuit elements shown in Figure 1 at 70, 71, 72, 73, 74 provide means for applying to the crystal two components of voltage, one depending on the voltage developed between $E_1$ and $E_2$ and the other on the rate of change of this voltage. This acts as a dividing network and reduces the voltage available for the crystal, which must therefore be compensated by an increase in the input levels. The current which flows through the resistances 70, 73 and 74 produces a drop across resistance 70 which is in phase with the voltage between $E_1$ and $E_2$, and the current which flows through the capacitors 71 and 72 is advanced in phase as compared with the voltage just mentioned and hence produces a drop across resistor 70 which is advanced in phase. It is this component of voltage which will cause the motor to act as a damper. In order to achieve the desired results the capacitors 7 and 13 must be small enough to have little effect at frequencies of reversal of the motor, but they can still act as effective filters for the control tone. The capacity of the crystal 27 may be assumed to be so small that little current passes through it compared with the resistor 70. Resistances 73 and 74 may be of the order of megohms and it is preferable that resistance 70 be about equal to that of 73 and 74 together. If without the network here described the system is found to tend to oscillate at a frequency, for example, of one cycle per second, then the time constants of the capacity and resistor 71 and 73 and likewise of 72 and 74 should be of the order of one second, but the exact value of the condensers should be determined by the constants of any particular system for prevention of oscillation without causing too much sluggishness in action.

The invention has been described as an electrical servo system, responsive to variable magnitude A.-C. control voltage. The control voltage is converted to commercial line frequency A.-C., amplified, and applied to an A.-C. motor. A limiter circuit is included in the amplifier channel to improve the accuracy of operation by compensating static friction in the system. Although the described system is adapted for use with A.-C. control signals, it will be apparent that D.-C. signals may be used by omitting the rectifier 3 and applying the signal directly to the resistor 5.

I claim as my invention:

1. A servo system for controlling the position of a mechanical load device in accordance with a variable magnitude control voltage, including means for producing an auxiliary voltage bearing a predetermined magnitude relationship to the position of said load device, piezoelectric crystal means connected to respond by physical distortion to the difference between said control voltage and said auxiliary voltage, means providing balanced magnetic fields, magnetic armature means coupled to said crystal and supported thereby normally in neutral relationship to said balanced fields, a pick-up winding surrounding said armature, amplifier means connected to said pick-up winding, and an electric motor connected to said amplifier and coupled to said load device.

2. The invention as set forth in claim 1, wherein said amplifier means includes at least two cascaded stages, and limiter means connected between said stages whereby the overall gain between said pick-up winding and said motor varies in response to the amplitude of the output of said pick-up winding as a function predetermined in accordance with the frictional characteristics of said motor and said load device.

3. In a servo system for controlling the position of a load device in accordance with the magnitude of a control voltage, including means for producing an auxiliary voltage bearing a predetermined magnitude relationship to the position of said load device, means for combining differentially said auxiliary voltage and said control voltage to produce a resultant signal, an electric motor coupled to said load device, and amplifier means responsive to said resultant signal to control the energization of said motor, a voltage limiter circuit connected between said combining means and said amplifier means to modify the variations in amplitude of said resultant signal in accordance with a predetermined function of the frictional characteristics of said motor and said load device.

4. The invention as set forth in claim 3, wherein said voltage limiter circuit comprises push pull input coupling means, a pair of unilaterally conductive devices connected in series circuit between the opposite extremes of said push pull coupling means, said devices being connected for conduction in opposite directions with respect to said series circuit, and D.-C. means connected between the center of said push pull coupling means and the point of connection of said unilaterally conductive devices to each other in such polarity so as to tend to oppose conduction by both of said unilaterally conductive devices.

5. The invention as set forth in claim 3, wherein said voltage limiter circuit comprises push pull input coupling means, a pair of unilaterally conductive devices connected in series circuit between the opposite extremes of said push pull coupling means, said devices being connected for conduction in opposite directions with respect to said series circuit, D.-C. bias means connected between the center of said push pull coupling means and the point of connection of said unilaterally conductive devices to each other in such polarity as to tend to oppose conduction by both of said unilaterally conductive devices, and resistors connected in said series circuit to limit the currents in said unilaterally conductive devices.

6. The invention as set forth in claim 3 wherein said voltage limiter circuit comprises at least one diode rectifier device, a resistor, and a D.-C. bias source connected in series with each other and effectively shunting the input circuit of said amplifier means.

7. In a servo system for controlling the position of a load device in accordance with the magnitude of a control voltage, including means for producing an auxiliary voltage bearing a predetermined magnitude relationship to the position of said load device, means for combining differentially said auxiliary voltage and said control voltage to produce a resultant signal, means for adding to said resultant signal a component of signal voltage proportional to the time rate of change of said resultant signal, an electric motor coupled to said load device, and amplifier means responsive to said resultant signal to control the energization of said motor, a voltage limiter circuit connected between said combining means and said amplifier means to modify the variations in amplitude of said resultant signal in accordance with a predetermined function of the frictional characteristics of said motor and said load device.

EDWARD W. KELLOGG.